(12) United States Patent
Huang et al.

(10) Patent No.: US 8,659,558 B2
(45) Date of Patent: Feb. 25, 2014

(54) TOUCH SENSING DISPLAY PANEL

(75) Inventors: Chau-Shiang Huang, Keelung (TW);
Yu-Feng Chien, Taipei County (TW);
Tun-Chun Yang, Taipei (TW);
Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 996 days.

(21) Appl. No.: 12/703,779

(22) Filed: Feb. 11, 2010

(65) Prior Publication Data

US 2011/0057900 A1  Mar. 10, 2011

(30) Foreign Application Priority Data

Sep. 9, 2009 (TW) ................................ 98130403 A

(51) Int. Cl.
*G09G 5/00* (2006.01)

(52) U.S. Cl.
USPC ........ 345/173; 345/175; 345/178; 178/18.01; 178/18.06

(58) Field of Classification Search
USPC ..................... 345/173–178; 178/18.01–19.01
See application file for complete search history.

(56) References Cited

U.S. PATENT DOCUMENTS

| | | | |
|---|---|---|---|
| 6,137,427 A | 10/2000 | Binstead | |
| 7,030,860 B1 | 4/2006 | Hsu et al. | |
| 7,932,898 B2 * | 4/2011 | Philipp et al. | 345/174 |
| 8,134,540 B2 * | 3/2012 | Kuo et al. | 345/174 |
| 8,255,002 B2 * | 8/2012 | Nakahara et al. | 455/566 |
| 8,274,494 B2 * | 9/2012 | Frey et al. | 345/174 |
| 2009/0002337 A1 | 1/2009 | Chang | |
| 2009/0322702 A1 * | 12/2009 | Chien et al. | 345/174 |
| 2010/0065342 A1 * | 3/2010 | Shaikh | 178/18.06 |

FOREIGN PATENT DOCUMENTS

| | | |
|---|---|---|
| CN | 101059737 | 10/2007 |
| CN | 101408825 A | 4/2009 |
| TW | 200304569 | 10/2003 |
| TW | 200901014 | 1/2009 |

OTHER PUBLICATIONS

"First Office Action of China Counterpart Application", issued on Jan. 10, 2011, p. 1-p. 4.
"Office Action of Taiwan Counterpart Application", issued on Dec. 20, 2012, p. 1-p. 7.

* cited by examiner

*Primary Examiner* — Jennifer Nguyen
(74) *Attorney, Agent, or Firm* — Jianq Chyun IP Office

(57) ABSTRACT

A touch-sensing display panel including a display panel and a touch-sensing unit is provided. The touch-sensing unit includes a plurality of first sensing series, a plurality of second sensing series and a plurality of sensing signal transmission lines. Each of the first sensing series includes a plurality of first sub-sensing series and a plurality of first conductive branches connected with the first sub-sensing series. Each of the second sensing series includes a plurality of second sub-sensing series and a plurality of second conductive branches connected with the second sub-sensing series. The first sensing series and the second sensing series are intersected. Further, each one of the first sensing series and each one of the second sensing series is electrically connected to one of the sensing signal transmission lines, respectively.

20 Claims, 9 Drawing Sheets

TOUCH SENSING DISPLAY PANEL

CROSS-REFERENCE TO RELATED APPLICATION

This application claims the priority benefit of Taiwan application serial no. 98130403, filed on Sep. 9, 2009. The entirety of the above-mentioned patent application is hereby incorporated by reference herein and made a part of specification.

BACKGROUND OF THE INVENTION

1. Technical Field

The present invention relates to a touch sensing display panel. More particularly, the present invention relates to a capacitive touch sensing display panel.

2. Description of Related Art

Touch sensing display panels can be roughly categorized into, according to the sensing methodologies, resistive type, capacitive type, optical type, acoustic type and electromagnetic type. Due to its short response speed, favorable reliability and durability, a capacitive touch sensing display panel has been widely accepted in electronic products. According to the structural and manufacturing differences, the capacitive touch sensing panel can be further classified into an add-on type touch sensing panel, an on-cell touch sensing panel and an in-cell touch sensing panel. In the add-on type capacitive touch sensing panel, sensing series are first formed on a substrate, and the substrate having the sensing series is then adhered to an outer surface of a display. Apparently, the substrate of the add-on type touch sensing panel brings about an increase in the overall thickness of the touch sensing panel. Comparatively speaking, the on-cell touch sensing panel and the in-cell touch sensing panel are favorable to the miniaturization and microminiaturization of a display.

The fabrication of the on-cell touch sensing panel, the in-cell touch sensing panel or the add-on type touch sensing panel faces the problems of inadequate yield in the manufacturing process or low yield due to electrostatic discharge. For example, the fabrication of the current on-cell touch sensing panel and the in-cell type touch sensing panel involve first forming a control circuit on one of the surfaces of the substrate and forming a color filter layer on another surface of the substrate thereafter. During the fabrication of the color filter layer, the touch sensing circuit is often broken during the fabrication process due to insufficient yield or damaged due to electro-static discharge. Moreover, when the on-cell touch sensing panel, the in-cell type touch sensing panel or the add-on type touch sensing panel is touched by a finger of a user, electro-static discharge is likely to occur, and the touch sensing circuit is damaged possibly.

FIGS. 1A and 1B are schematic diagrams of a conventional touch sensing circuit. Referring to FIGS. 1A and 1B, the conventional touch sensing substrate 100 includes a plurality of first sensing series 120 and a plurality of second sensing series 130. Each of the first sensing series 120 extends along a first direction D1, and the first sensing series 120 are electrically insulated from each other. As shown in FIGS. 1A and 1B, each of the first sensing series 110 includes a plurality of first sensing pads 112 and a plurality of first bridge lines 114, wherein the first bridge lines 114 respectively connects with two neighboring first sensing pads 112 electrically. Each of the second sensing series 120 extends along a second direction D2, and each of the second sensing series 120 is electrically insulated from each other. Each of the second sensing series 120 includes a plurality of second sensing pads 122 and a plurality of bridge lines 124, and each of the second bridge lines 124 respectively connects with two neighboring second sensing pads electrically. Further, the first sensing series 110 and the second sensing series 120 are electrically insulated.

When the yield in a fabrication process is inadequate or damages occur due an electrostatic discharge, the first sensing series 110 and the second sensing series 120 are often broken as in region A as shown in FIG. 1B. Since electro-static discharge is inevitable in a manufacturing process and during application, being able to enhance electro-static discharge protection in a control circuit 100 is an importation issue to be resolved by designers in the industry.

When the sensing series is broken in the display region, it is not easy to repair. Hence, the panel is discarded and wasted. Accordingly, lowering the demands on repairing is another important issue to be resolved.

SUMMARY OF THE INVENTION

In view of the foregoing, the invention provides a touch sensing display panel, in which the demands on repairing are effectively reduced.

The invention provides a touch sensing display panel that includes a display panel and a touch sensing unit. The touch sensing unit is configured on the display panel, and the touch sensing unit includes a plurality of first sensing series, a plurality of second sensing series and a plurality of touch sensing transmission lines. Each of the first sensing series includes a plurality of first sub-sensing series and a plurality of first conductive branches connected with the first sub-sensing series. Each second sensing series includes a plurality of second sub-sensing series and a plurality of second conductive branches connected with the second sub-sensing series. Further, the first sub-sensing series and the second sub-sensing series intersect with each other. Each sensing signal transmission line respectively connects with one of the first sensing series or one of the second sensing series.

According to an embodiment of the invention, the above-mentioned display panel includes a first substrate, a second substrate and a display medium, wherein the second substrate is disposed above the first substrate, and the display medium is displayed in between the first substrate and the second substrate.

According to an embodiment of the invention, the above-mentioned display medium includes a liquid crystal layer, an electrophoretic display medium layer or an organic electroluminescent display medium layer.

According to an embodiment of the invention, the above-mentioned touch sensing unit is disposed on an exterior surface of the display panel.

According to an embodiment of the invention, the above-mentioned touch sensing unit is constructed inside the display panel.

According to an embodiment of the invention, each of the above-mentioned first sub-sensing series includes a plurality of first sensing pads and a plurality of conductive bridges, wherein each of the first conductive bridges respectively connects with two neighboring first sensing pads.

According to an embodiment of the invention, the above-mentioned first conductive branches connect the first sensing pads configured on different first sub-sensing series.

According to an embodiment of the invention, each of the above-mentioned second sub-sensing series includes a plurality of second sensing pads and a plurality of second conductive bridges, wherein each of the second conductive bridges respectively connects with two neighboring second sensing pads.

According to an embodiment of the invention, the above-mentioned second conductive branches connect the second sensing pads configured on different second sub-sensing series.

According to an embodiment of the invention, each of the above-mentioned first sensing pads, first conductive bridges and first conductive branches in the first sub-sensing series are arranged in a first mesh structure, and the first mesh structure includes a plurality of first meshes, and the position of each first mesh corresponds to the position of one of the second sensing pads.

According to an embodiment of the invention, each of the above-mentioned second sensing pads, second conductive bridges and second conductive branches in the second sub-sensing series are arranged in a second mesh structure, and the second mesh structure includes a plurality of second meshes, and the position of each second mesh corresponds to the position of one of the first sensing pads.

According to an embodiment of the invention, the above-mentioned touch sensing panel further includes a sensing signal read-out circuit, wherein the sensing signal read-out circuit electrically connects with the first sensing series and the second sensing series through the touch sensing signal transmission lines.

According to an embodiment of the invention, the above-mentioned first sensing pads include transparent conductive sensing pads, and the transparent conductive sensing pads are constituted with a material that includes, but not limited to, indium tin oxide, indium zinc oxide, or aluminum zinc oxide.

According to an embodiment of the invention, the above-mentioned first sensing pads include metal mesh-shaped sensing pads, and the metal mesh-shaped sensing pads are constituted with a material that includes, but not limited to, aluminum, copper, molybdenum, tungsten or gold. Further, the line width of the metal mesh-shaped sensing pads is between 0.1 micron to 10 micron.

Accordingly, the sub-sensing series in the sensing series of the embodiment of the invention are electrically connected via a plurality of conductive branches. Hence, it is highly improbable that the sensing series become broken to result with the problem of no signal transmission. Moreover, the demands on repairing are also reduced. Additionally, the conductive branches in the sensing series further reduce the damages that are resulted from electro-static discharge (ESD) to the sensing series.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
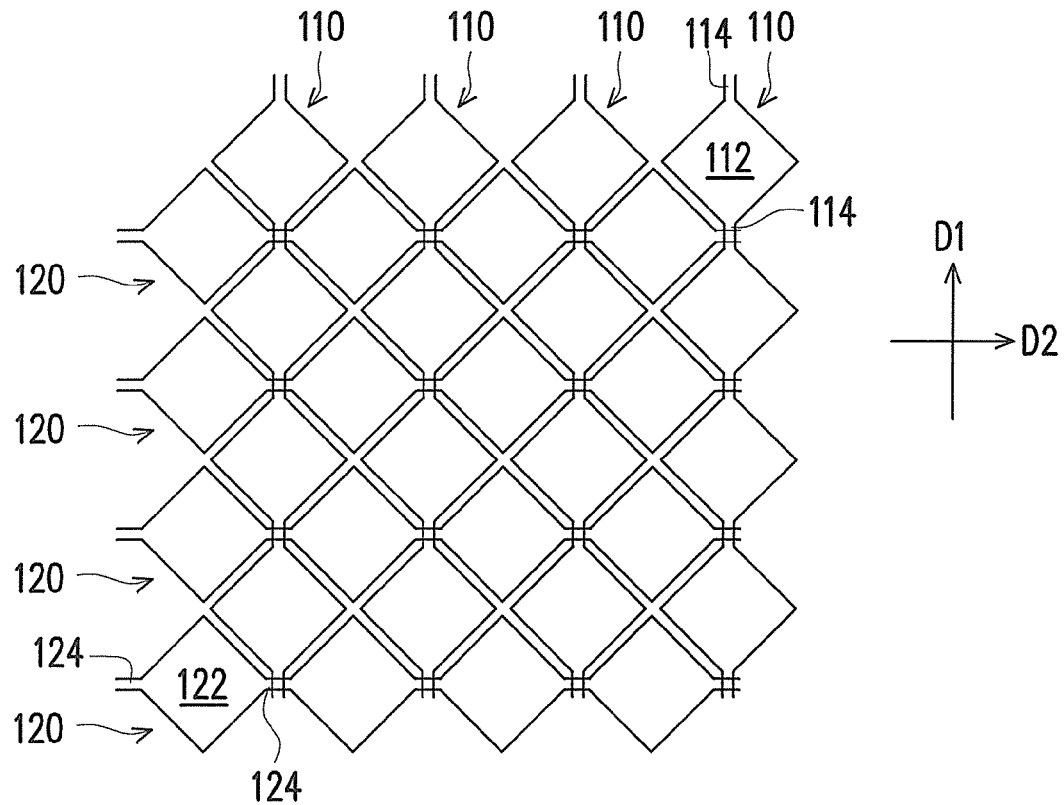
FIGS. 1A to 1B are schematic diagrams of a conventional touch sensing circuit.
Figure 1B:
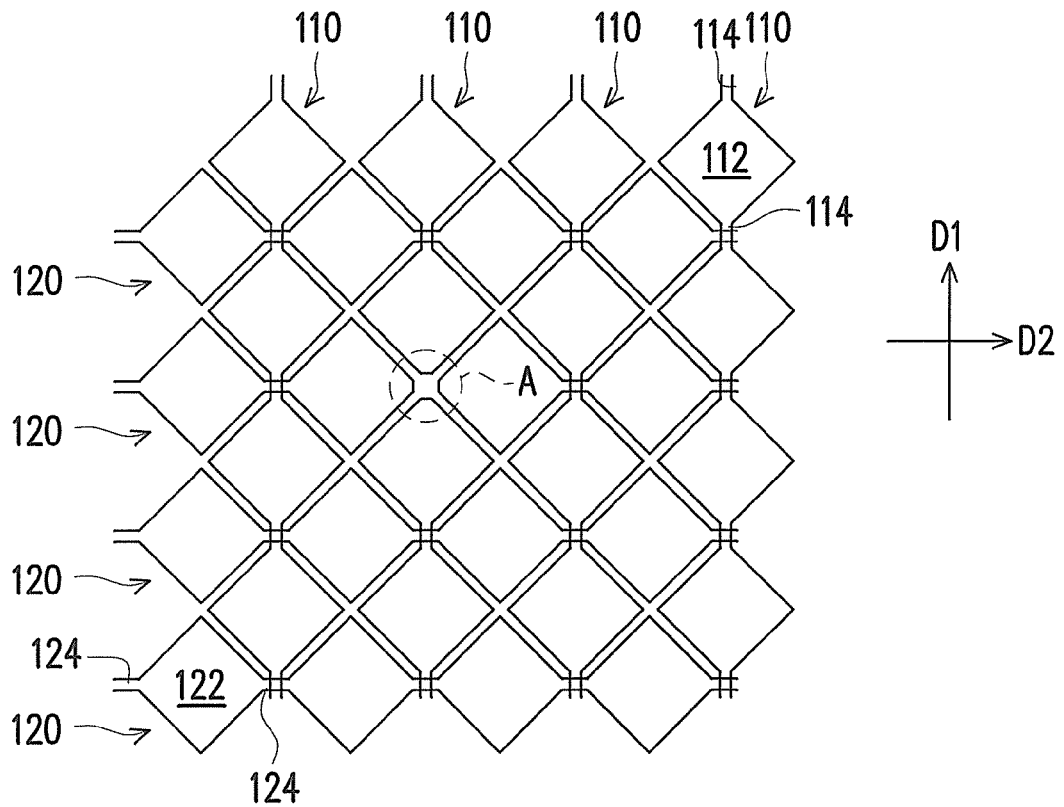

FIGS. 2A to 2F are schematic, cross-sectional diagrams of different touch sensing display panels according to the embodiments of the invention. Referring to FIGS. 2A to 2F, the touch sensing display panel 200 in an embodiment includes a display panel 210 and a touch sensing unit 220 disposed on the display panel 210. In this embodiment, the display panel 210 includes a first substrate 212, a second substrate 214 and a display medium 216, wherein the second substrate 214 is disposed above the first substrate 212, and the display medium 216 is disposed between the first substrate 212 and the second substrate 214. In one aspect, the first substrate 212 is a thin film transistor array substrate (TFT array substrate) having a pixel array 212a, the second substrate 214 is a color filter substrate, while the display medium layer 216 is a liquid crystal layer. However, in other embodiments, the first substrate 212 is a color filter on array (COA) substrate and the second substrate is an opposite substrate having a common electrode. Further, the display medium 216 applied in these embodiments may include an electrophoretic display medium layer, an organic electroluminescent display medium layer or other display medium.

Figure 2A:
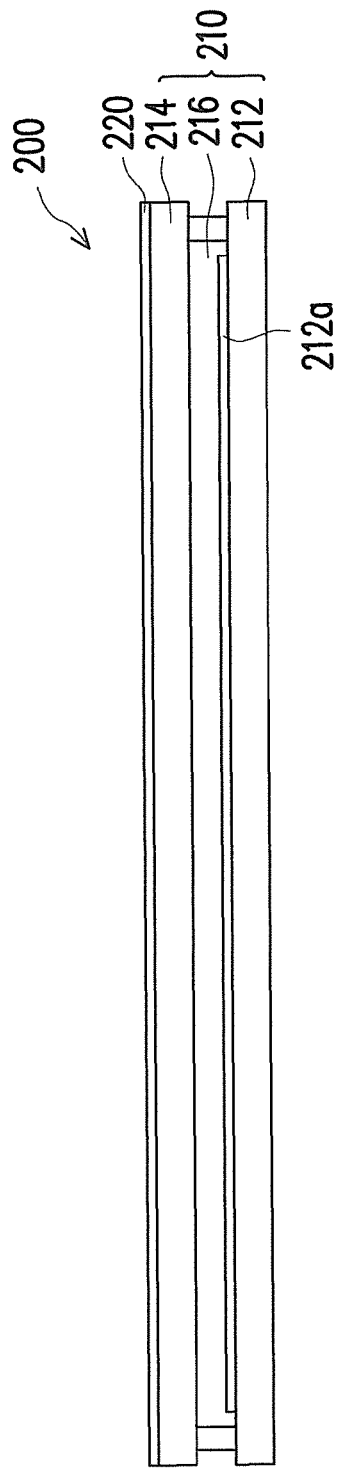
FIGS. 2A to 2F are schematic, sectional-view diagrams of different touch sensing display panels according to several exemplary embodiments of the invention.
Figure 2B:
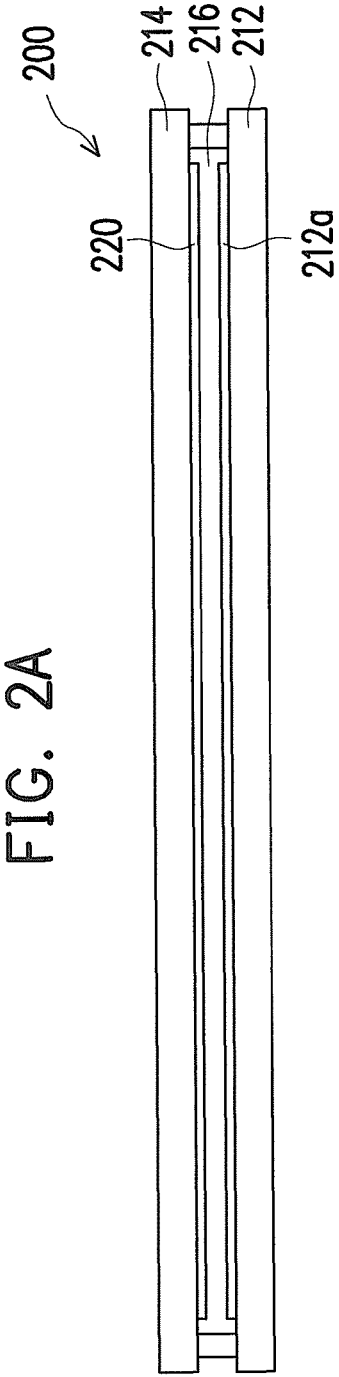
Figure 2C:
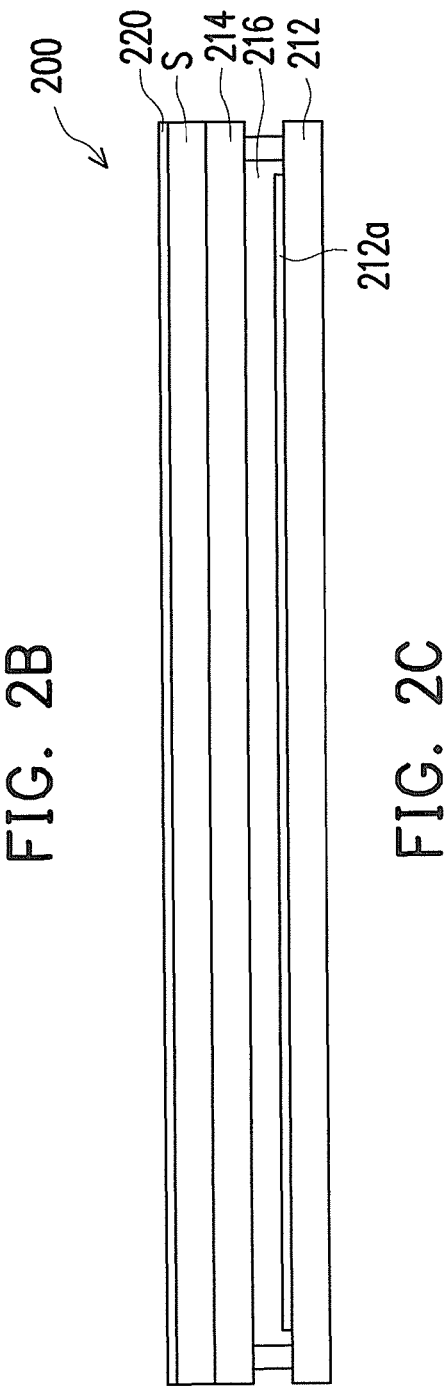
Figure 2D:
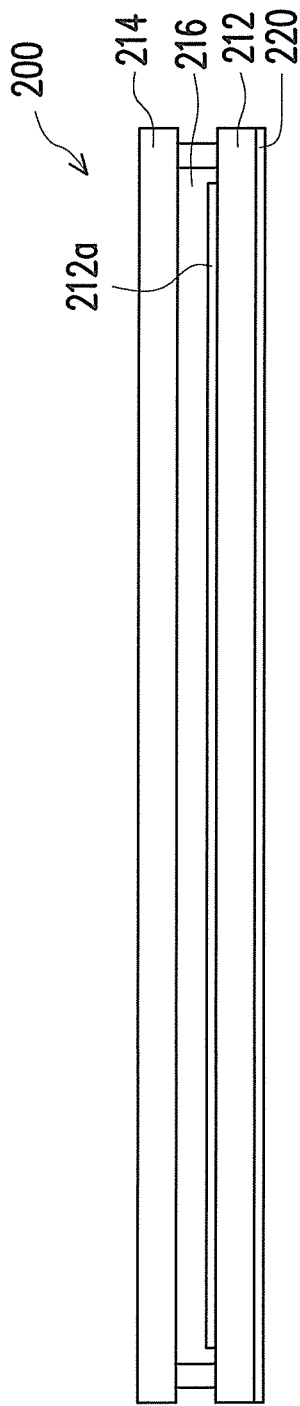
Figure 2E:
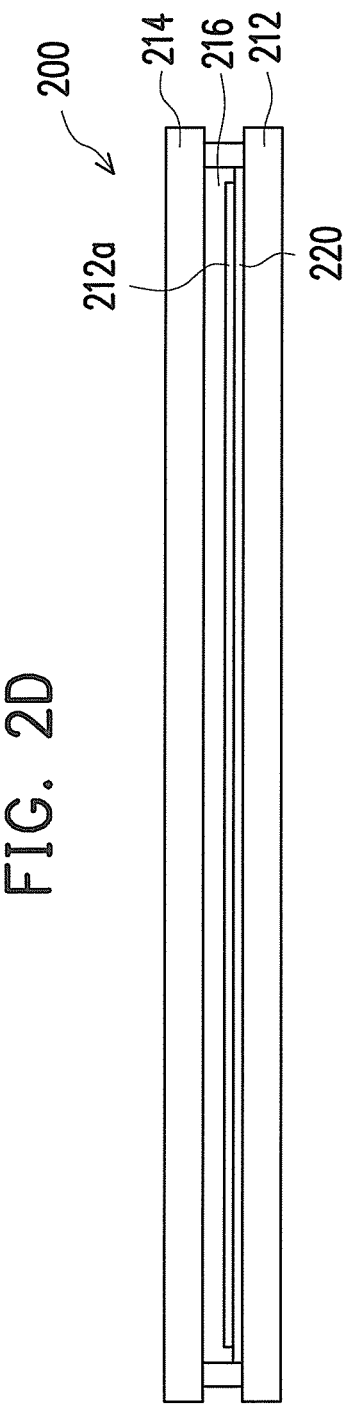
Figure 2F:
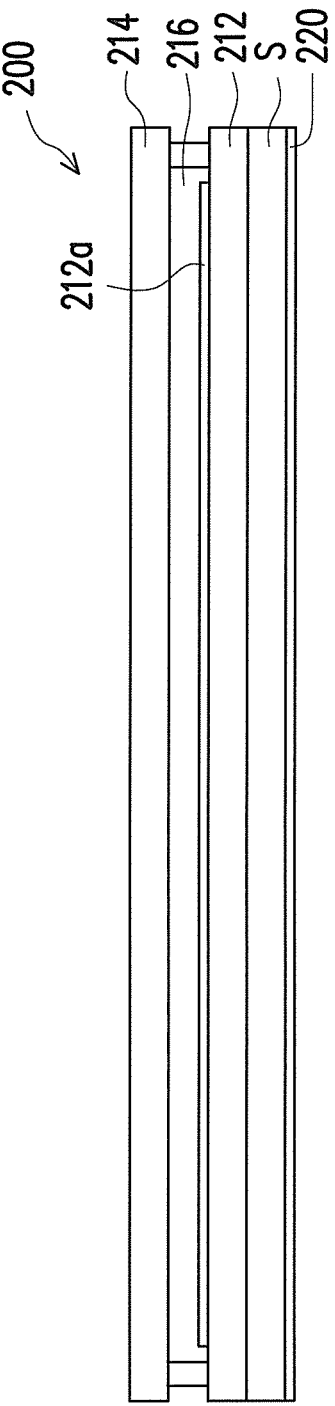

In this exemplary embodiment, the touch sensing unit 220 is disposed on an exterior surface of the display panel 210. In other words, the touch sensing unit 220 may dispose on the first substrate 212 or the second substrate 214 (as shown in FIGS. 2A, 2D), or may dispose inside the interior of the display panel 210 (as shown in FIGS. 2B and 2E). Further, the touch sensing unit 220 may first be disposed on an auxiliary substrate S, and the auxiliary substrate S is adhered on the exterior surface of the first substrate 212 or the second substrate 214 (as shown in FIGS. 2C and 2F). When the touch sensing unit 220 is disposed on an exterior surface of the display panel 210, the touch sensing display 200 is the so-called on-cell touch sensing panel (as shown in FIGS. 2A, 2D). When the touch sensing unit 220 is adhered on the exterior surface of the display panel 210 via an auxiliary substrate S, the touch sensing display panel 200 is the so-called add-on type touch sensing display panel (as shown in FIGS. 2C and 2F). When the touch sensing unit 220 is configured inside the interior of the display panel 210, the touch sensing display panel 200 is the so-called in-cell touch sensing display panel (FIGS. 2B, 2E).

More particularly, the touch sensing unit 220 may directly form on the exterior surface of second substrate 214 of the display panel 210, as shown in FIG. 2A. Further, the touch sensing unit 220 may first faun on an auxiliary substrate S, and the substrate S with the touch sensing unit 220 formed thereon is adhered on the exterior surface of the second substrate 214 of the display panel 210, as shown in FIG. 2C. Alternatively, the touch sensing unit 220 may form directly on an exterior surface of the first substrate of the display panel 210, as shown in FIG. 2D. Additionally, the touch sensing unit 220 may first form on an auxiliary substrate S, and the substrate S with the touch sensing unit 220 already formed thereon is adhered on the exterior surface of the first substrate 212 of the display panel 210, as shown in FIG. 2F.

Reference will now be made in detail to the touch sensing unit 220, examples of which are illustrated in the accompanying drawings of FIGS. 3A to 3C and 4A to 4B.

First Exemplary Embodiment

Figure 3A:
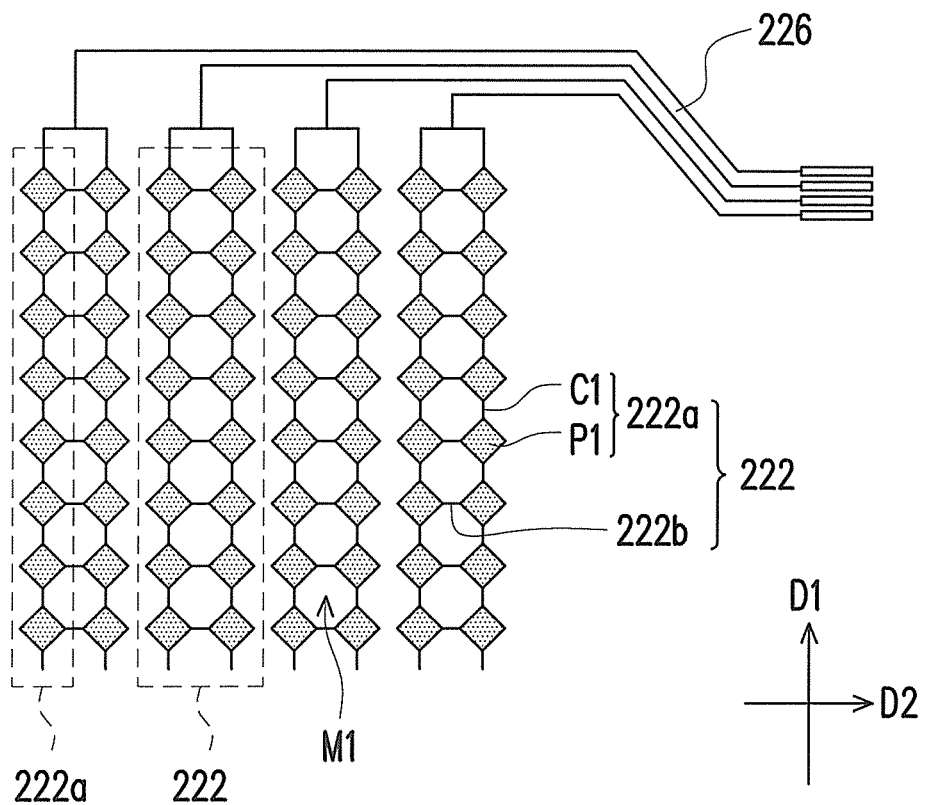
FIGS. 3A to 3C and 4A to 4B are schematic diagrams of the touch sensing unit according to the first exemplary embodiment of the invention.
Figure 3B:
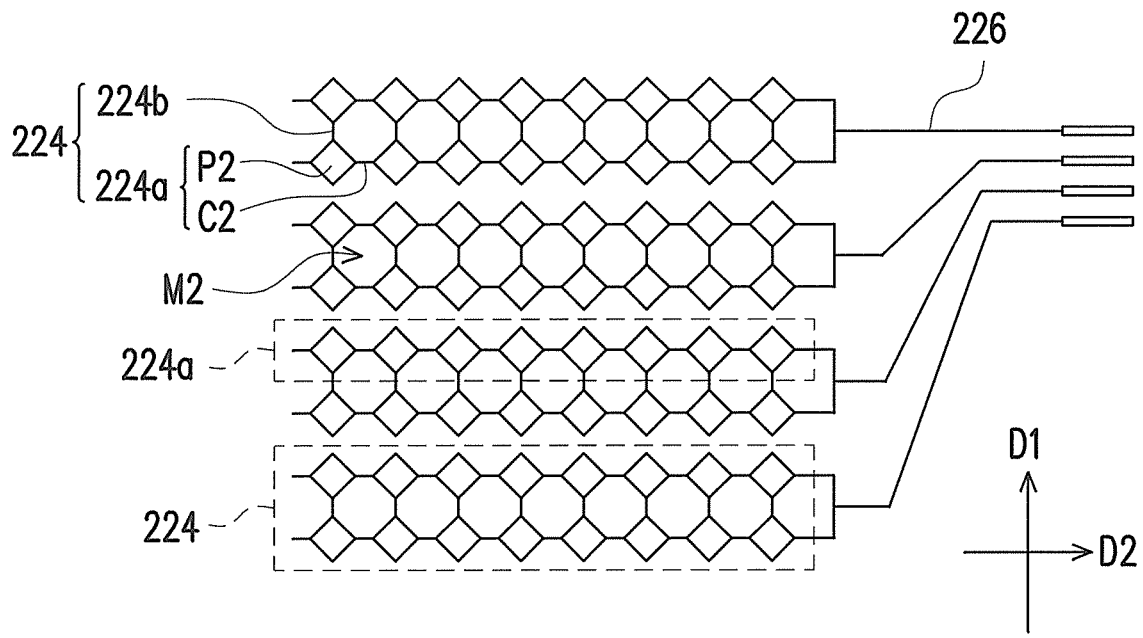
Figure 3C:
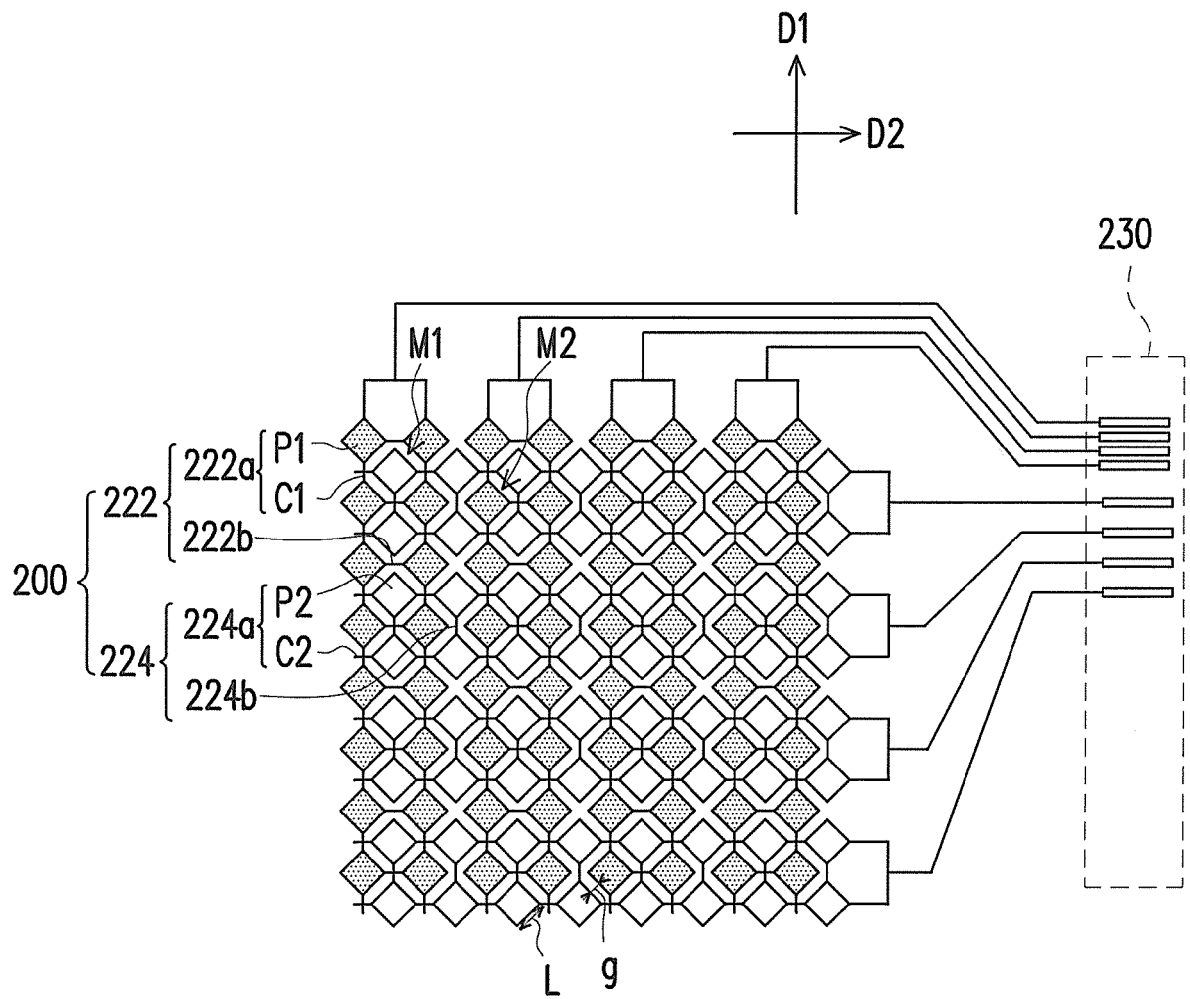

FIGS. 3A to 3C and 4A to 4B are schematic diagrams of the touch sensing unit according to a first exemplary embodiment of the invention. Referring to FIGS. 3A to 3C, the touch sensing unit 220 in this exemplary embodiment includes a plurality of first sensing series 222, a plurality of second sensing series 224 and a plurality of sensing signal transmission lines 226. Each first sensing series 222 includes a plurality of first sub-sensing series 222a and a plurality of first conductive branches (i.e. conductive branch lines or conductive branch segments) 222b connecting the pluralities of first sub-sensing series 222a. Each second sensing series 224 includes a plurality of second sub-sensing series 224a and a plurality of second conductive branches 224b connecting the plurality of second sub-sensing series 224b. The first sensing series 222 and the second sensing series 224 intersect with each other. Each sensing signal transmission line respectively connects with one of the first sensing series 222 or one of the second sensing series 224.

In this exemplary embodiment, each of the above-mentioned first sub-sensing series 222a includes a plurality of first sensing pads P1 and a plurality of conductive bridges (i.e. conductive bridge lines or conductive bridge segments) C1, wherein each first conductive bridge C1 respectively connects with two neighboring first sensing pads P1. As shown in FIGS. 3A and 3C, the first conductive branches 222b connect the first sensing pads P1 on different first sub-sensing series 222a. Further, each of the previously mentioned second sub-sensing series 224a includes a plurality of second sensing pads P2 and a plurality of second bridges C2, wherein each second conductive bridge C2 respectively connects with two neighboring second sensing pads P2. According to FIGS. 3B and 3C, the second conducive branches 224b connect the second sensing pads P2 on different second sub-sensing series 224b. As shown in FIGS. 3A to 3C, in this exemplary embodiment, using two first sub-sensing series 224a and second sub-sensing series 224b as an example, the four neighboring first sensing pads P1 form a first sensing unit along a first direction (for example, the D1 direction), and the four neighboring second sensing pads P2 form a second sensing unit along the second direction (for example, the D2 direction). The first sub-sensing series 224a and the second sub-sensing series 224b respectively can include multiple sub-sensing series, for example, three or four sub-sensing series to enhance the sensing effect.

In design, the length of a side L of the first sensing pad P1 and the second sensing pad P2 is, for example, between 0.5 mm (millimeter) to 8 mm. More preferably, the length L is between 1 mm to 6 mm, for example, 4 mm. The distance g between the first sensing pad and the second sensing pad P2 is, for example, between 0.01 mm and 1 mm. More preferably, the distance g is between 0.01 mm and 0.8 mm, for example, 0.5 mm. The length L and the distance g of the first sensing pads P1 and the second sensing pads P2 could be modified according the design requirement.

In one exemplary embodiment of the invention, the first sensing pads P1 or the second sensing pads P2 include transparent conductive sensing pads, and a material of the transparent conductive sensing pads includes, but not limited to, indium tin oxide, indium zinc oxide, or aluminum zinc oxide. In this and other exemplary embodiments of the invention, the first sensing pads P1 or the second sensing pads P2 include metal mesh-shaped sensing pads, and the material of the metal mesh-shaped sensing pads includes, but not limited to, aluminum, copper, molybdenum, tungsten or gold. Moreover, the line width of the metal mash shaped sensing pads is, for example, between 0.1 micron to 10 micron. The mesh pattern of the metal mesh-shaped sensing pads includes, for example, triangle, square, rhombus, hexagonal, polygonal, and circle, etc. A metal mesh-shaped sensing pad with a square pattern is used an example. In this example, the side length of the square pattern is, for example, between 10 microns and 600 microns.

Referring to FIGS. 3A and 3C, the first sensing pads P1, the first conductive bridges C1 and the first conductive branches 222b in each of the first sensing series 222 are arranged into a first meshed structure, and the first meshed structure includes a plurality of first meshes M1, and the position of each first mesh M1 corresponds to the position of one of the second sensing pads P2. Further, the second sensing pads P2, the second conductive bridges C2 and the second conductive branches 224b in each sensing series 224 are arranged in a second meshed structure. The second meshed structure includes a plurality of second meshes M2, and the position of each second mesh M2 corresponds to the position of one of the first sensing pads P1. Since the first sensing pads P1 intersect with the second sensing unit, the second sensing pads P2 intersect with the first sensing unit, touching the first sensing pads P1 and the second sensing pads P2 concurrently by the finger of a user is facilitated. According to the design of this embodiment of the invention, detection of the position is achieved to obviate an unintentional action.

It is worthy to note that, since the first conductive bridges C1 intersect with the second conductive branches 224b, the first conductive bridges C1 and the second conductive branches 224b are fabricated with different layers of patterned thin films to prevent a short at the intersection between the first conductive bridges C1 and the second conductive branches 224b. In one exemplary embodiment, an insulation layer is disposed between the first conductive bridges C1 and the second conductive branches 224b to prevent a short at the intersections between the first conductive bridges C1 and the second conductive branches 224b. In an alternative exemplary embodiment, the insulation layer may be replaced with multiple patterned insulation blocks. Further, the first sensing pads P1 and the second sensing pads P2 are fabricated with a same layer to improve transparency and to increase sensing uniformity.

For example, when the first conductive bridges C1, the first sensing pads P1 and the second sensing pads P2 are fabricated concurrently, and the second conductive branches 224b are fabricated using another layer of metal thin film (alternative exemplary embodiment 1). Similarly, when the second conductive branches 224b, the first sensing pads P1 and the second sensing pads P2 are fabricated concurrently, the first conductive bridges C1 are fabricated using another layer of metal thin film (alternative exemplary embodiment 2). Further, when the second conductive bridges C2, the first sensing pads P1 and the second sensing pads P2 are fabricated concurrently, the first conductive branches 222b are fabricated with another layer of metal thin film (alternative exemplary embodiment 3). On a similar note, when the first conductive branches 222b, the first sensing pads P1 and the second sensing pads are fabricated concurrently, the second conductive bridges C2 are fabricated using another layer of metal thin film (alternative exemplary embodiment 4).

Accordingly, a manufacturer may select alternative exemplary embodiment 1 or alternative exemplary embodiment 2 to fabricate the intersecting first conductive bridges C1 and the second conductive branches 224b. The manufacturer may select alternative exemplary embodiment 3 or alternative exemplary embodiment 4 to fabricate the intersecting second conductive bridges C2 and the first conductive branches 222b. Moreover, the above-mentioned alternative exemplary embodiment 1 may arbitrary pairs with alternative exemplary embodiment 3 or alternative exemplary embodiment 4. Similarly, the above-mentioned alternative exemplary embodiment 2 may arbitrary pair with alternative exemplary embodiment 3 or alternative exemplary embodiment 4.

In this exemplary embodiment, the touch sensing panel 200 may further include a sensing signal read-out circuit 230, wherein the sensing signal read-out circuit 230 electrically connects with the first sensing series 222 and the second sensing series 224 through the sensing signal transmission lines 226.

Figure 4A:
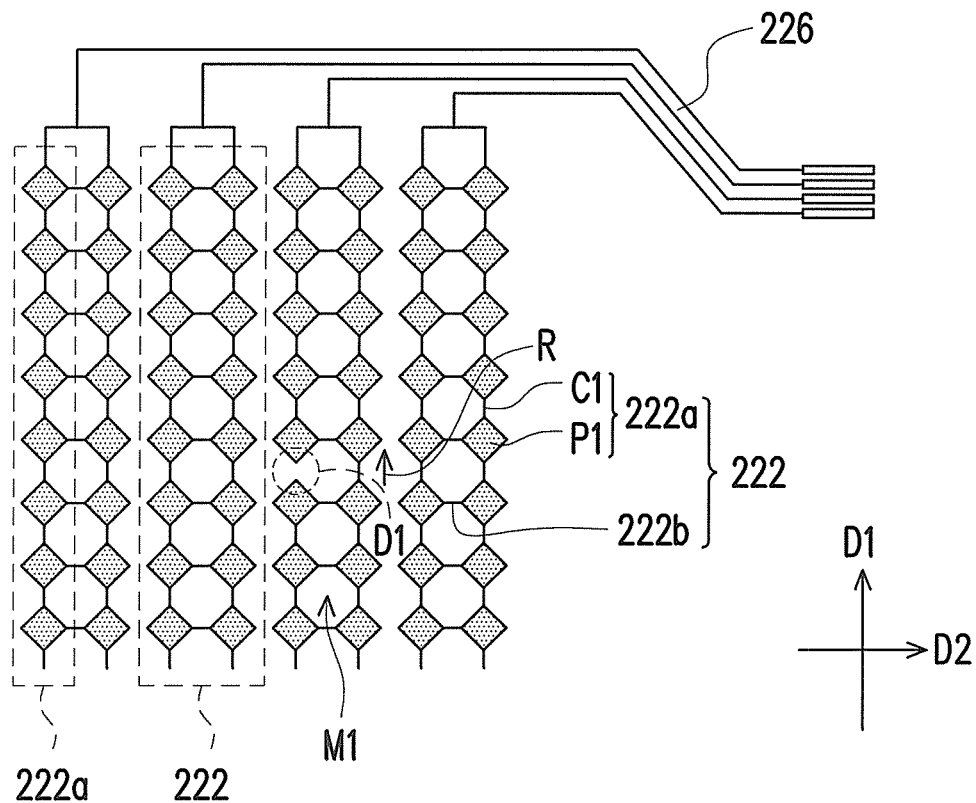
Figure 4B:
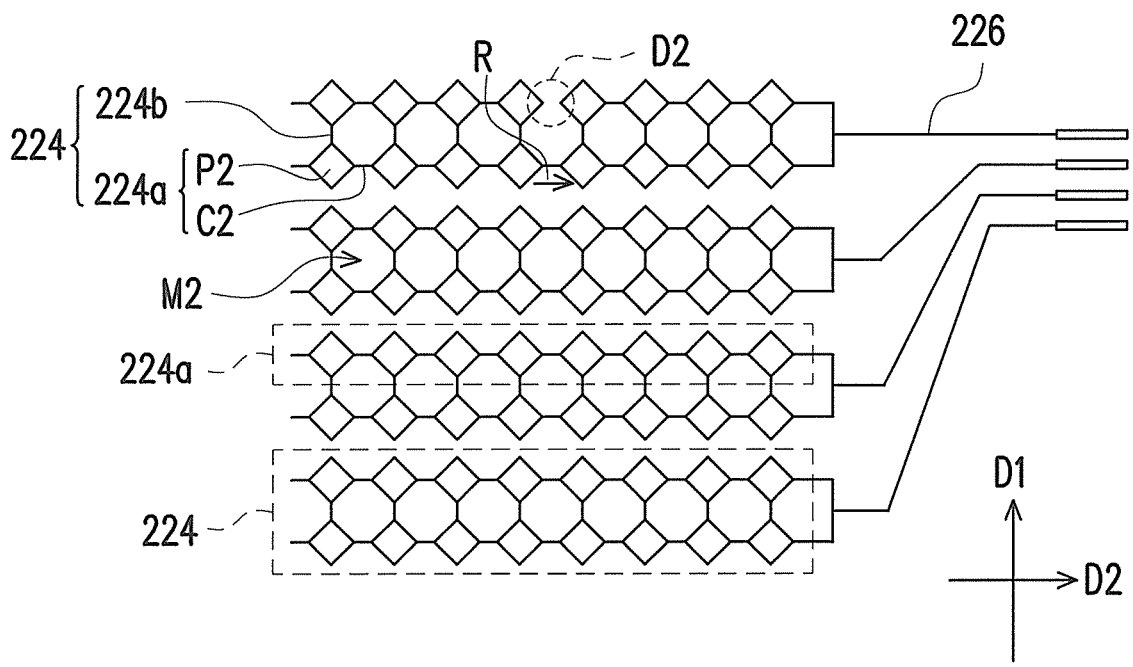

Referring to FIGS. 4A and 4B, when the first conductive bridge C1 in region A1 is broken, the first sensing series 222 are still able to transmit the sensing signal (the substitute route R) through the neighboring first conductive branches 222b to maintain the electrical connections between the first sensing pads P1. Similarly, when the second conductive bridge C2 in region A2 is broken, the second sensing series 224 are still able to transmit the sensing signal (the substitute route R) through the neighboring second conductive branches 224b to maintain the electrical connections between the second sensing pads P2. According to the first sensing series 222 and the second sensing series 224 in this exemplary embodiment, the problem of no transmission of the sensing signal due to a broken line is mitigated and the need for repairing is reduced.

Second Exemplary Embodiment

Figure 5A:
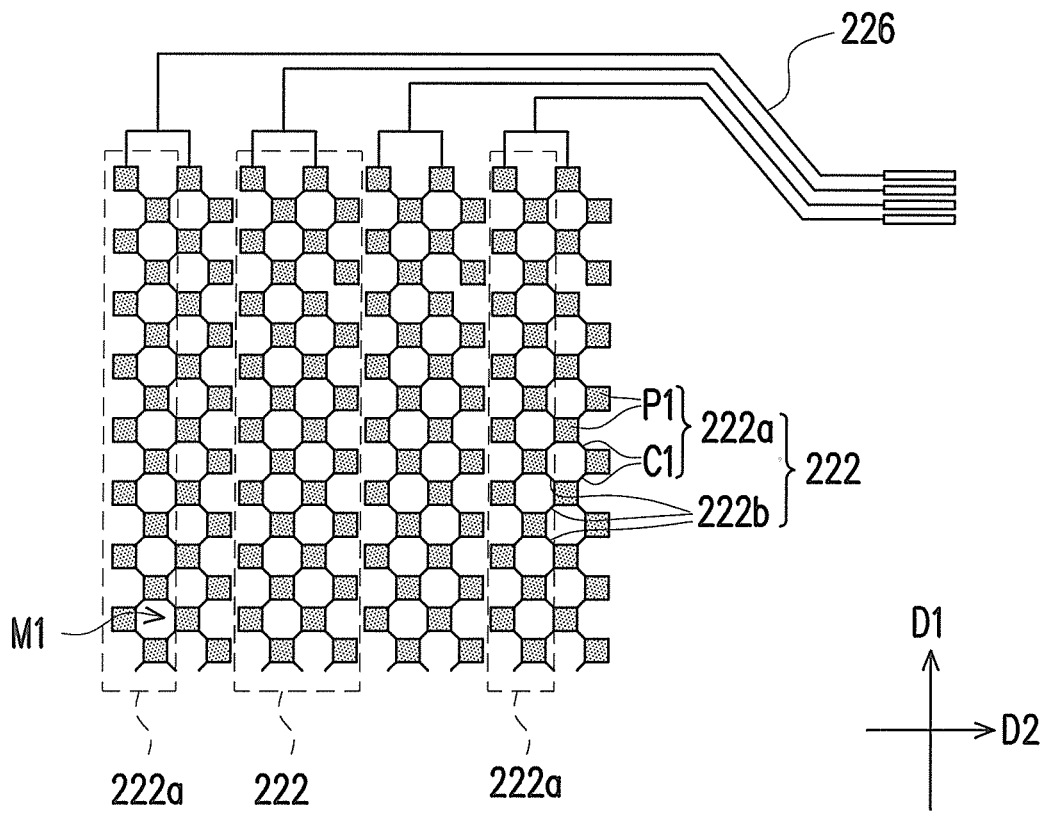
FIGS. 5A to 5C and 6A to 6B are schematic diagrams of the touch sensing unit according to the second exemplary embodiment of the invention.
Figure 5B:
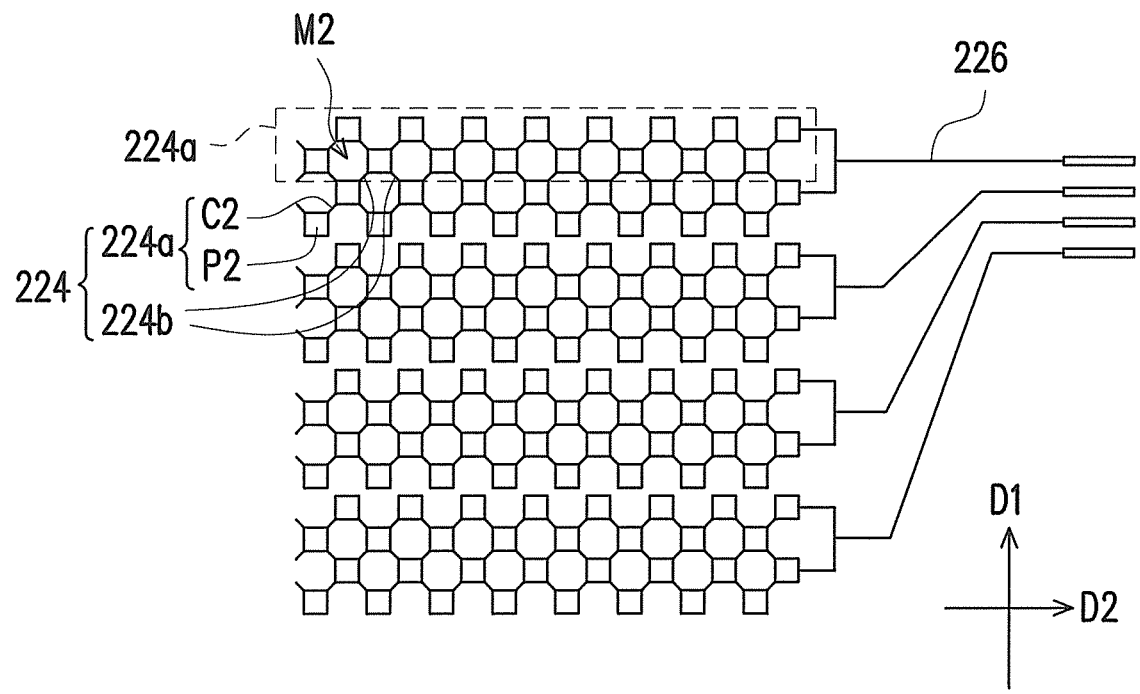
Figure 5C:
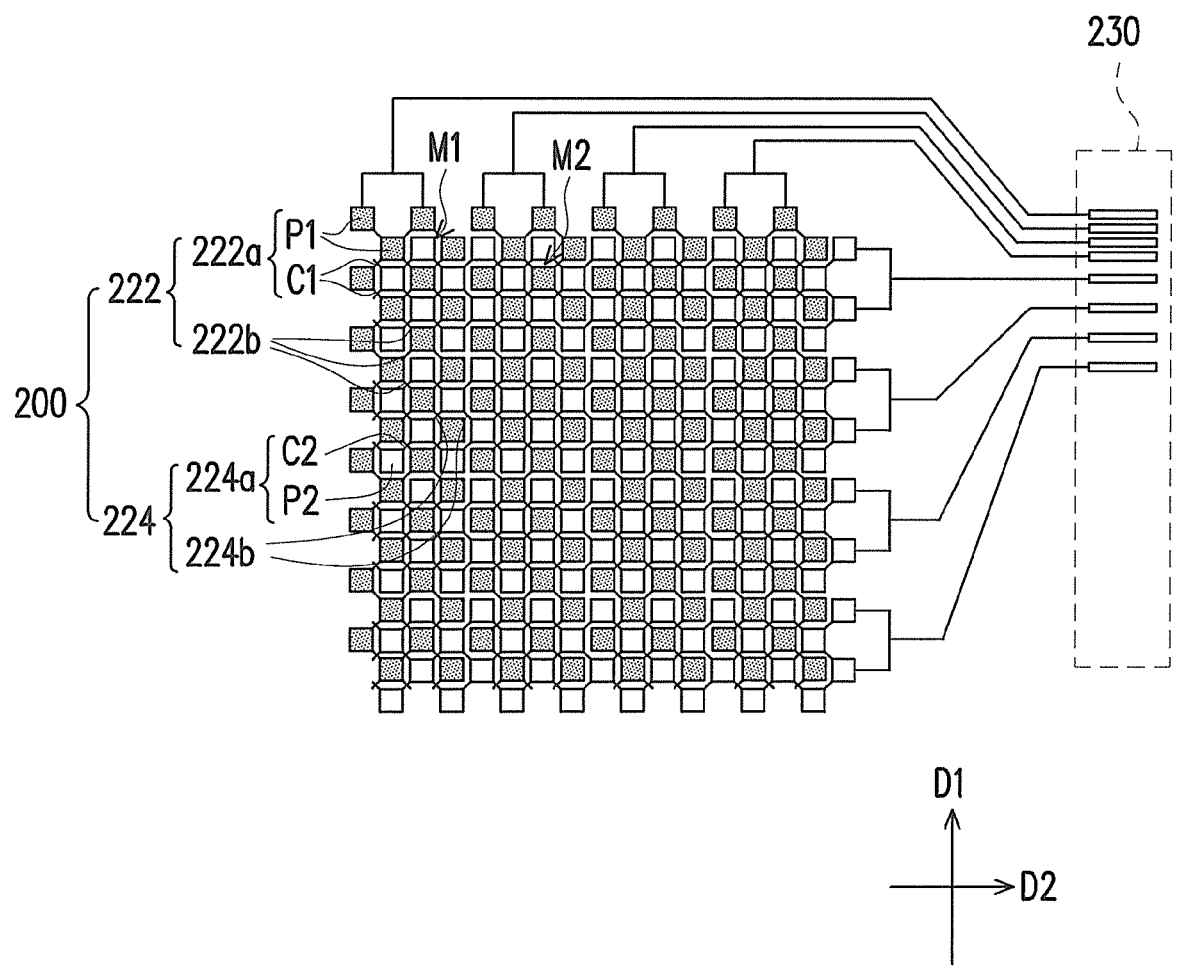

FIGS. 5A to 5C and 6A to 6B are schematic diagrams of a touch sensing unit according to a second exemplary embodiment of the invention. Referring to FIGS. 5A and 5C, the touch sensing unit 220' in this exemplary embodiment is similar to the touch sensing unit 220 in the first exemplary embodiment. The major difference is the arrangement of the first touch sensing pads P1 and the second touch sensing pads P2.

As shown in FIGS. 5A to 5C, the touching sensing pads P1 in a same sub-sensing series 222a are arranged in a zigzag manner, and the first touch sensing pad P1 are electrically connected to each other via a plurality of inclinded first conductive bridges C1.

Figure 6A:
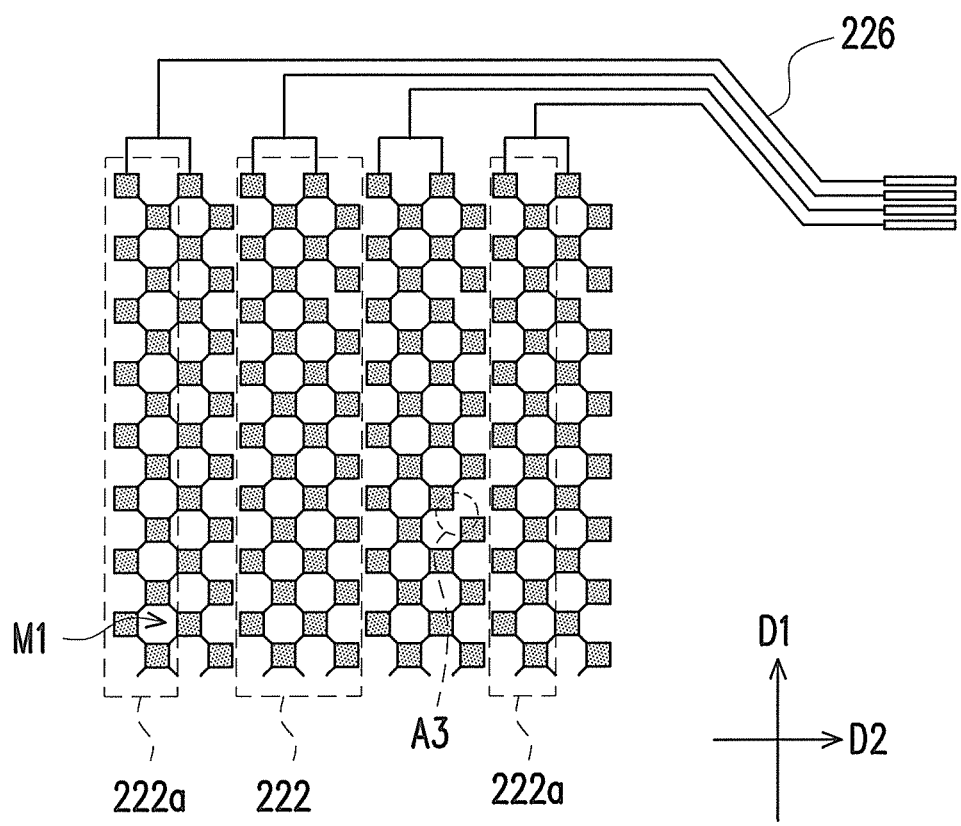
Figure 6B:
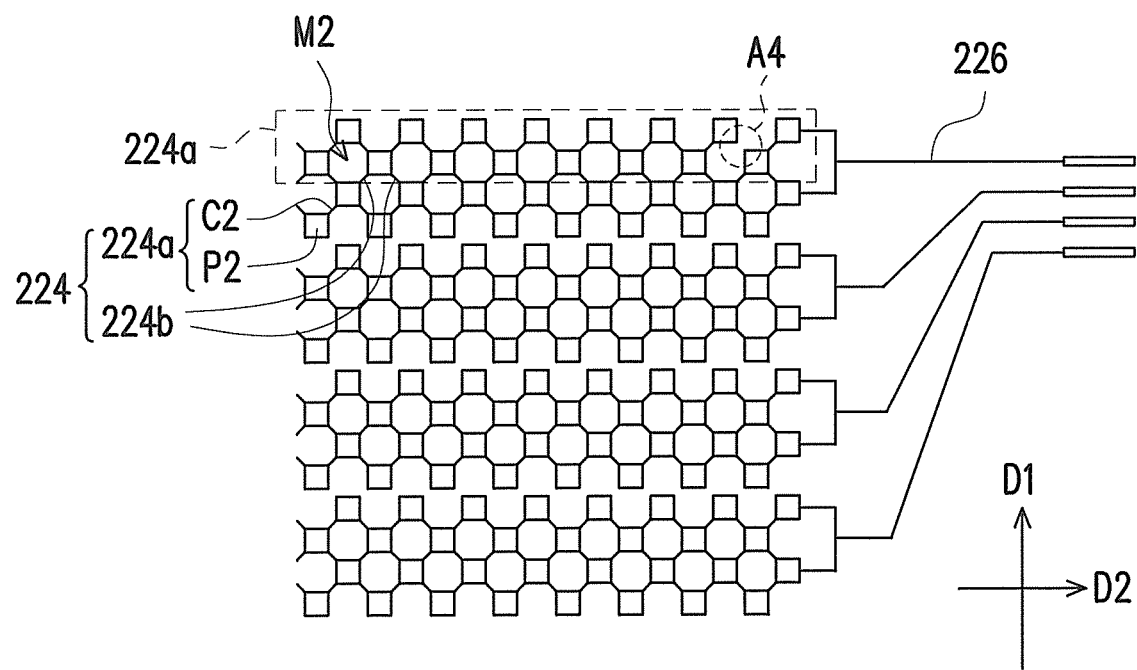

Referring to FIGS. 6A to 6B, when the first conductive bridge C1 in region A3 is broken, the first sensing series 222 are able to maintain electrical connections among the first sensing pads P1 through the first conductive branches 222b. Similarly, when the second conductive bridge C2 in region A4 is broken, the second sensing series 224 are able to maintain electrical connections among the second sensing pads P2 through the second conductive branches 224b. Accordingly to the first sensing series 222 and the second sensing series 224 in this exemplary embodiment, the problem of no transmission of the sensing signal due to a broken line is mitigated and the need for repairing is reduced.

Accordingly, the sub-sensing series in the sensing series are electrically connected to each other through the plurality of conductive branches. Hence, problem of no transmission of the sensing signal due to a broken line is mitigated and the need for repairing is reduced. Moreover, the conductive branches in the sensing series further lower the damages due to electrostatic discharge.

Additionally, since the sub-sensing series on the two directions intersect with each other, touching the first sensing pads P1 and the second sensing pads P2 concurrently by the finger of a user is facilitated. According to the design of this embodiment of the invention, the detection of the position is easily achieved to prevent an unintentional action.

Although the disclosure herein refers to certain illustrated embodiments, it is to be understood that these embodiments are presented by way of example and not by way of limitation. The intent of the detailed description is to cover all modifications, alternatives, and equivalents as may fall within the spirit and scope of the invention as defined by the appended claims. Moreover, any embodiment of the invention or claims to achieve all the features, advantages or characteristics disclosed in the invention. Additionally, the abstract and the title of the invention are intended to facilitate patent search and not intended to be restrictive of the spirit and scope of the invention.

What is claimed is:

1. A touch sensing display panel comprising:
   a display panel;
   a touch sensing unit, disposed on the display panel, wherein the touch sensing unit comprises:
      a plurality of first sensing series, wherein each of the first sensing series comprises a plurality of first sub-sensing series and a plurality of first conductive branches connecting the plurality of the first sub-sensing series, wherein each of the plurality of the first sub-sensing series comprises:
         a plurality of first sensing pads; and
         a plurality of first conductive bridges, wherein each of plurality of the first conductive bridges respectively connects with two neighboring first sensing pads of the plurality of the first sensing pads;
      a plurality of second sensing series, wherein each of the plurality of the second sensing series comprises a plurality of second sub-sensing series and a plurality of second conductive branches connecting the plurality of the second sub-sensing series, wherein each of the plurality of the second sub-sensing series comprises:
         a plurality of second sensing pads; and
         a plurality of second conductive bridges, wherein each of the plurality of the second conductive bridges respectively connects with two neighboring second sensing pads of the plurality of the second sensing pads; and
      a plurality of sensing signal transmission lines, wherein each of the plurality of the sensing signal transmission lines respectively connects with one of the plurality of the first sensing series or one of the plurality of the second sensing series, wherein each of the first sensing pads is not overlapped with the adjacent second sensing pads, and a gap is between each of the first sensing pads and the adjacent second sensing pads.

2. The touch sensing display panel of claim 1, wherein the display panel comprises:
   a first substrate;
   a second substrate, disposed above the first substrate; and
   a display medium, disposed between the first substrate and the second substrate.

3. The touch sensing display panel of claim 2, wherein display medium comprises a liquid crystal layer, an electrophoretic display medium layer or an organic electroluminescent display medium layer.

4. The touch sensing display panel of claim 2, wherein the touch sensing unit is disposed on an exterior surface of the display panel.

5. The touch sensing display panel of claim 4 further comprising an auxiliary substrate, disposed between the touch sensing unit and the display panel.

6. The touch sensing display panel of claim 1, wherein the touch sensing unit is constructed inside the display panel.

7. The touch sensing display panel of claim 1, wherein the plurality of the first conductive branches connects the plurality of the first sensing pads configured on different first sub-sensing series of the plurality of the first sub-sensing series.

8. The touch sensing display panel of claim 1, wherein the plurality of the second conductive branches connects the plurality of the second sensing pads configured on different second sub-sensing series of the plurality of the second sub-sensing series.

9. The touch sensing display panel of claim 1, wherein the first sensing pads, the first conductive bridges and the first conductive branches in each of the plurality of the first sensing series are arranged to form a first meshed structure, and the first meshed structure comprises a plurality of first meshes, and a position of each of the plurality of the first meshes corresponds with a position of one of the plurality of the second sensing pads.

10. The touch sensing display panel of claim 1, wherein the second sensing pads, the second conductive bridges and the second conductive branches in each of the plurality of the second sensing series are arranged to form a second meshed structure, and the second meshed structure comprises a plurality of second meshes, and a position of each of the plurality of the second meshes corresponds with a position of one of the plurality of the first sensing pads.

11. The touch sensing display panel of claim 1 further comprising a sensing signal read-out circuit, wherein the sensing signal read-out circuit is electrically connected with the plurality of the first sensing series and the plurality of the second sensing series through the plurality of the sensing signal transmission lines.

12. The touch sensing display panel of claim 1, wherein the plurality of the first sensing pads comprise transparent conductive sensing pads.

13. The touch sensing display panel of claim 12, wherein the transparent conductive sensing pads are constituted a material comprising indium tin oxide, indium zinc oxide, or aluminum zinc oxide.

14. The touch sensing display panel of claim 1, wherein the plurality of the first sensing pads comprise metal mesh-shaped sensing pads.

15. The touch sensing display panel of claim 14, wherein the metal mesh-shaped sensing pads are constituted with a material comprising aluminum, copper, molybdenum, tungsten or gold.

16. The touch sensing display panel of claim 14, wherein a line width of the metal mesh-shaped sensing pads ranges from 0.1 to 10 micron.

17. The touch sensing display panel of claim 1, wherein the first sensing pads and the second sensing pads are disposed in a same layer.

18. The touch sensing display panel of claim 1, wherein each of the first sensing series correspondingly intersects with each of the second sensing series to form a plurality of cross areas.

19. The touch sensing display panel of claim 18, wherein one of the first conductive branches in each of the first sensing series correspondingly intersects with one of the second conductive branches in each of the second sensing series substantially in a central region of the cross areas, correspondingly.

20. A touch sensing panel comprising:
a substrate;
a touch sensing unit, disposed on the substrate, wherein the touch sensing unit comprises:
a plurality of first sensing series, wherein each of the first sensing series comprises a plurality of first sub-sensing series and a plurality of first conductive branches connecting the plurality of the first sub-sensing series, wherein each of the plurality of the first sub-sensing series comprises:
a plurality of first sensing pads; and
a plurality of first conductive bridges, wherein each of plurality of the first conductive bridges respectively connects with two neighboring first sensing pads of the plurality of the first sensing pads;
a plurality of second sensing series, wherein each of the plurality of the second sensing series comprises a plurality of second sub-sensing series and a plurality of second conductive branches connecting the plurality of the second sub-sensing series, wherein each of the plurality of the second sub-sensing series comprises:
a plurality of second sensing pads; and
a plurality of second conductive bridges, wherein each of the plurality of the second conductive bridges respectively connects with two neighboring second sensing pads of the plurality of the second sensing pads; and
a plurality of sensing signal transmission lines, wherein each of the plurality of the sensing signal transmission lines respectively connects with one of the plurality of the first sensing series or one of the plurality of the second sensing series, wherein each of the first sensing pads is not overlapped with the adjacent second sensing pads, and a gap is between each of the first sensing pads and the adjacent second sensing pads.

* * * * *